United States Patent
McNutt et al.

(10) Patent No.: US 8,369,668 B1
(45) Date of Patent: Feb. 5, 2013

(54) WATER BLOCKED FIBER OPTIC CABLE

(75) Inventors: Christopher W. McNutt, Woodstock, GA (US); James J. Puzan, Canton, GA (US)

(73) Assignee: Superior Essex Communications LP, Atlanta, GA (US)

( * ) Notice: Subject to any disclaimer, the term of this patent is extended or adjusted under 35 U.S.C. 154(b) by 459 days.

(21) Appl. No.: 12/799,385

(22) Filed: Apr. 23, 2010

Related U.S. Application Data

(60) Provisional application No. 61/214,426, filed on Apr. 23, 2009.

(51) Int. Cl.
*G02B 6/44* (2006.01)
(52) U.S. Cl. ........................................ 385/109
(58) Field of Classification Search ............. 385/100, 385/109, 113
See application file for complete search history.

(56) References Cited

U.S. PATENT DOCUMENTS

| | | | | |
|---|---|---|---|---|
| 4,913,517 A * | 4/1990 | Arroyo et al. | ............. | 385/107 |
| 5,131,064 A * | 7/1992 | Arroyo et al. | ............. | 385/102 |
| 5,133,034 A * | 7/1992 | Arroyo et al. | ............. | 385/107 |
| 5,373,100 A * | 12/1994 | Arroyo et al. | ............. | 174/23 R |
| 7,646,953 B2 * | 1/2010 | Dowd et al. | ............. | 385/109 |
| 8,135,252 B2 * | 3/2012 | Overton et al. | ............. | 385/100 |
| 8,195,018 B2 * | 6/2012 | Overton et al. | ............. | 385/100 |

* cited by examiner

*Primary Examiner* — Akm Enayet Ullah

(57) ABSTRACT

A fiber optic cable can inhibit water that may inadvertently enter the cable from flowing lengthwise within the cable. The fiber optic cable can include a buffer tube defining an interior volume extending along the cable. Water blocking barriers can be disposed in the buffer tube intermittently along the length of the cable. The barriers can be formed from a UV and thermal cured material and can comprise an acrylic. The barriers can be applied to the optical fibers or to a carrier tape that is wrapped around the optical fibers or fiber bundle. The barriers (or carrier tape) can be disposed against and/or adhere to an inner surface of the buffer tube to provide intermittent water blocking. Each barrier can provide a seal around the optical fibers and can limit flow of water in the interior volume.

21 Claims, 7 Drawing Sheets

WATER BLOCKED FIBER OPTIC CABLE

CROSS REFERENCE TO RELATED APPLICATIONS

This patent application claims priority under 35 U.S.C. §119 to U.S. Provisional Patent Application No. 61/214,426, entitled "Water Blocked Fiber Optic Cable and Fabrication Process" and filed Apr. 23, 2009, the entire contents of which are hereby incorporated herein by reference.

TECHNICAL FIELD

The present invention relates generally to water blocked fiber optic communication cables and more specifically to forming water barriers at intermittent longitudinal locations within a core of a cable.

BACKGROUND

Fiber optic cables include one or more optical fibers or other optical waveguides that conduct optical signals, for example carrying voice, data, video, or other information. In a typical cable arrangement, optical fibers are placed in a tubular assembly. A tube may be disposed inside an outer jacket or may form the outer jacket. In either case, the tube typically provides some level of protection for the fibers contained therein.

Optical fibers are ordinarily susceptible to damage from water and physical stress. Without an adequate barrier, moisture may migrate into a fiber optic cable and weaken or destroy the cable's optical fibers. Without sufficient protection, stress or shock associated with handling the fiber optic cable may transfer to the optical fibers, causing breakage or stress-induced signal attenuation.

One conventional technique for protecting the optical fibers is to fill the cable with a fluid, a gel, a grease, or a thixotropic material that strives to block moisture incursion and to absorb mechanical shock. Such fluids and gels are typically messy and difficult to process, not only in a manufacturing environment but also during field service operations. Field personnel often perform intricate and expensive procedures to clean such conventional materials from optical fibers in preparation for splicing, termination, or some other procedure. Any residual gel or fluid can render a splice or termination inoperably defective, for example compromising physical or optical performance.

Another conventional technology for protecting optical fibers entails placing a water-absorbent chemical, such as a water-swellable material, within the cable. The chemical absorbs water that may inadvertently migrate into the cable, to help prevent water from interacting with the delicate optical fibers. In one conventional approach, particles of the water absorbent chemical are mixed with the gel discussed above, and the mixture is inserted into the cable. This approach typically suffers from the same handling drawbacks as using a pure form of a gel; the materials are messy and difficult to process.

More and more, users are requesting cable designs that are completely dry and/or are substantially free from greasy gels inside the cable tubes or cable core interstices. Dry cables are much easier to process in the field and are faster to prepare compared to gel filled cables and thus have lower labor costs associated therewith. The all dry cables are typically lower in weight compared to gel filled cables, which adds to ease of installation. One conventional dry cable approach includes applying a water-swellable chemical to the surface of a tape or a yarn that is inserted in the cable lengthwise. If water enters the cable, the water-swellable chemical interacts with the water to attenuate water flow along the cable.

However, many dry cables manufactured with water-swellable tapes and yarns (e.g., Super Absorbent Polymers, or SAP), are limited in that they can not withstand water with high concentrations of ions (e.g., saltwater or seawater) and may not perform adequately against other types of soiled water (e.g., water containing oil, detergents, sewage, etc.). Furthermore, water-swellable tapes and yarns become too costly as the physical size of the cable and the free area inside the tubes increases. Moreover, the SAP's utilized by water-swellable tapes, yarns, and foams are expensive and known to degrade in the presence of ionic solutions. Especially for larger cable designs (for tube sizes over about 10 mm in diameter), the cost of water-swellable tapes, yarns, and foams is high and the water blocking performance is low.

Accordingly, to address these representative deficiencies in the art, an improved capability is needed for protecting optical fibers from water damage. A capability addressing one or more of the aforementioned needs, or some related need in the art, would provide robust fiber optic installments and would promote optical fibers for communications and other applications.

SUMMARY

The present invention can support protecting an optical fiber from damage due to moisture incursion.

In one aspect of the present invention, a fiber optic cable can include an outer jacket and a tube extending lengthwise. The tube can include an inner wall and be circumferentially surrounded by the outer jacket. An optical fiber (or fiber bundle) can be disposed inside the tube and extend lengthwise. Regions of (water blocking) barrier material can be spaced intermittently along the fiber optic cable. Each region of barrier material can circumferentially encapsulate the optical fiber and adhere to the inner wall of the tube to form a seal. Each region of barrier material can include a polymer or other material cured with a sequenced (or simultaneous) combination of heat and light, for example in a two-step curing process. For example, each region of barrier material can comprise derivatives of initiators or catalysts and/or reaction products associated with such curing.

The discussion of protecting optical fibers presented in this summary is for illustrative purposes only. Various aspects of the present invention may be more clearly understood and appreciated from a review of the following detailed description of the disclosed embodiments and by reference to the drawings and the claims that follow. Moreover, other aspects, systems, methods, features, advantages, processes, and objects of the present invention will become apparent to one with skill in the art upon examination of the following drawings and detailed description. It is intended that all such aspects, systems, methods, features, advantages, processes, and objects are to be included within this description, are to be within the scope of the present invention, and are to be protected by the accompanying claims.

Figure 1:
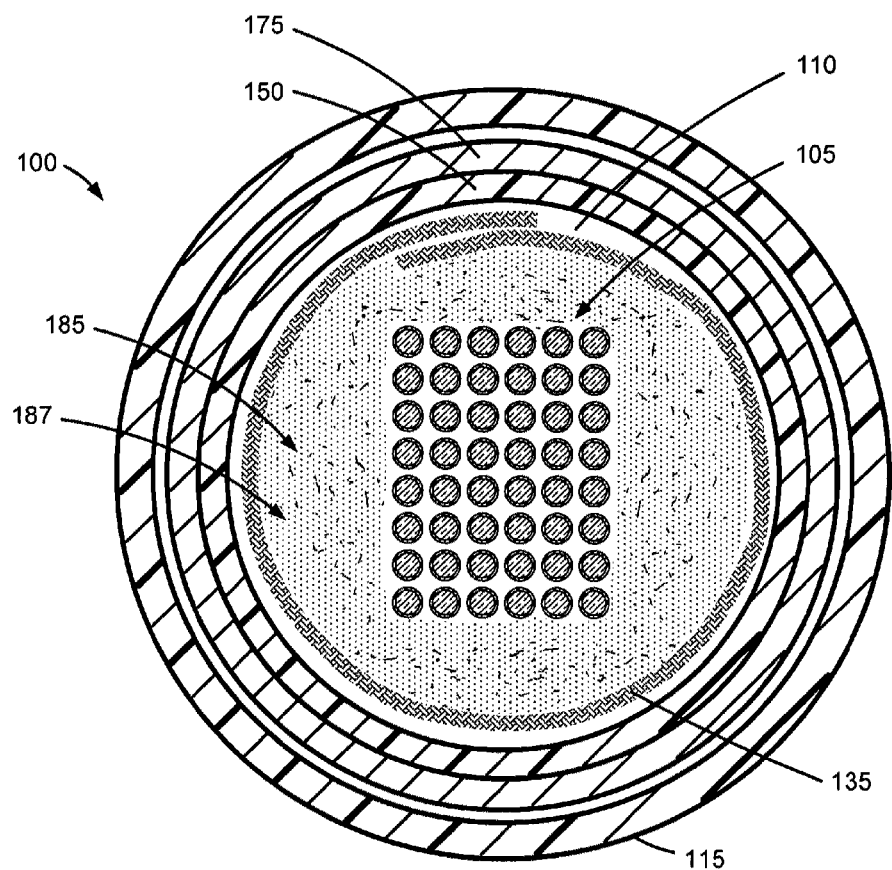
FIG. 1 is a cross sectional view of an exemplary fiber optic cable having water blocking barriers, in accordance with certain exemplary embodiments.

Many aspects of the invention can be better understood with reference to the above drawings. The elements and features shown in the drawings are not to scale, emphasis instead being placed upon clearly illustrating the principles of exemplary embodiments of the present invention. Moreover, certain dimensions may be exaggerated to help visually convey such principles. In the drawings, reference numerals designate like or corresponding, but not necessarily identical, elements throughout the several views.

DETAILED DESCRIPTION OF EXEMPLARY EMBODIMENTS

The present invention can support protecting an optical fiber from damage due to moisture incursion. Exemplary fiber optic cables described herein can include a totally gel-free buffer tube that is resistant to tap water as well as high concentration ionic water (e.g., seawater and saltwater) and other soiled water types (e.g., oil, detergents, sewage, etc.).

Exemplary embodiments of the present invention support protecting an optical fiber within a fiber optic cable from water attack, including blocking or suppressing water from flowing lengthwise within the cable. The protection also can include stabilizing the optical fiber and/or cushioning the optical fiber from mechanical impact, shock, physical stress, jarring, unwanted motion, damaging acceleration or deceleration, force, or other detrimental effect.

The fiber optic cable can comprise a jacket that extends along the fiber optic cable. The jacket can comprise a sheath, a sheathing, a casing, a shell, a skin, or a tube spanning the fiber optic cable, typically comprising pliable or flexible material such as plastic or polymer. Thus, the jacket can run lengthwise along the fiber optic cable. The jacket can form or define a core within the cable that can comprise a longitudinal cavity, a hollow space, or a cylindrical volume. In other words, the jacket can enclose a volume that contains various other elements, features, structures, or components of the fiber optic cable, with the jacket typically being open at the cable ends (prior to termination), and therefore exposing the core, at each end of the fiber optic cable.

One or more optical fibers can be situated in the core, running or extending lengthwise along the fiber optic cable. In certain exemplary embodiments, the core also may contain various other linear cabling components, such as strength members, tapes, rip cords, buffer tubes, etc.

Exemplary fiber optic cables can include a water blocking system that achieves high resistance to ionic water blocking, or any other soiled type water. The water blocking system can include a water barrier approach with water blocking barriers installed into the buffer tube intermittently along the length of the cable. The exemplary fiber optic cables can achieve water penetration resistance to seawater and other ionic solutions by having the water blocking barriers disposed at intermittent locations inside the buffer tube. The water blocking barriers can be formed from an ultraviolet ("UV") cured acrylate material and a secondary thermal cure system. For example, the water blocking barriers may be formed by exposing a barrier material having a UV photoinitiator and a thermal initiator to UV light to partially cure the barrier material and then to a heat source to finish the curing process. This heat source may be an extruder, for example applied while a buffer tube and/or jacket is being extruded over the optical fibers.

The barrier material can be applied onto a carrier tape and the carrier tape can be wrapped around the optical fibers prior to completing the curing process. An exterior surface (facing away from the optical fibers) of the carrier tape can be coupled or adhered to an inner wall of a buffer tube during the extrusion process. Together, the water blocking barriers and the carrier tape, collectively the fiber-barrier-tape system, provide the water blocking system inside the buffer tube.

In certain exemplary embodiments, the barrier material also can be applied directly to the optical fibers rather than to a carrier tape. In such an embodiment, the barrier material can be partially cured via an application of UV light prior to a buffer tube being extruded over the optical fibers. The barrier material can adhere to an inner wall or surface of the buffer tube to form water blocking barriers at intermittent locations within the buffer tube. The water blocking barriers each establish a seal around optical fiber bundles or optical fibers and blocks longitudinal water migration inside the tube.

In an exemplary embodiment, the cabling process utilizes a UV curable (along with a secondary thermal curing mechanism) acrylate material. Such a material is applied intermittingly inside the buffer tube and cured to form a mechanical type barrier around optical fibers, a bundle of optical fibers, or optical fiber ribbons. The UV curable material can be applied onto a carrier tape (for example a water blocking or water swellable tape). Following application, the material can be exposed to UV light and wrapped around the optical fibers such that the material cures to fit the outer profile of the optical fibers or optical fiber bundle. Alternatively, the UV material can be applied directly onto the optical fibers or optical fiber bundle, thus not employing a carrier tape. The optical fiber bundle or the optical fibers (and optionally the carrier tape) then pass through an extruder head (for application of the buffer tube) and the extrusion heat completes the curing process of the water barrier. The UV curable acrylate intermittently disposed within the buffer tube works as a system to block water travel and to also protect the fibers.

In certain exemplary embodiments comprising a carrier tape, a UV curable acrylate water blocking barrier couples optical fiber bundle or optical fibers to the carrier tape. The outside of the carrier tape can be coupled to an inner wall or surface of a buffer tube in such a way as to allow relative movement between the fiber-barrier-tape system and the buffer tube and cable, for example as the cable undergoes tensile, contractive, and bend loadings. This provides a higher degree of freedom for the optical fibers under cable tensile, thermal, and bending loads.

A gas, for example air, can be disposed in the volume with the optical fibers between each pair of water barriers. In other words, the areas within the core between two water blocking barriers and between the optical fibers and either an inner surface of the buffer tube or optional carrier tape can comprise a hollow region. Rather than these hollow regions or the buffer tube being filled with a fluid or gel for protecting the optical fibers, these hollow regions are typically dry (absent any unwanted water that might enter the buffer tube).

The term "dry," as used herein in the context of characterizing a fiber optic cable or a buffer tube or other region within a cable, generally indicates that the fiber optic cable or buffer tube or other region does not contain any fluids, greases, or gels for blocking water incursion.

During cable preparations, the water blocking barriers are gel-free and easily peel off the optical fibers and optical fiber bundle. The design achieves a low cost, low weight finished cable product that is easy (and clean) to access, has a high resistance to ionic water or other soiled type waters, and easily scales up to larger cable designs. This water barrier design is readily scalable to larger buffer tubes, including buffer tubes for typical 432 fiber and 864 fiber cable designs.

Exemplary embodiments can achieve a dry-tube water blocking system outperforming typical conventional water block tape, foam, and yarn technologies—and at a lower cost. The water blocking barriers can perform equally as well in tap water as in ionic water solutions or other types of soiled water.

Figure 2:
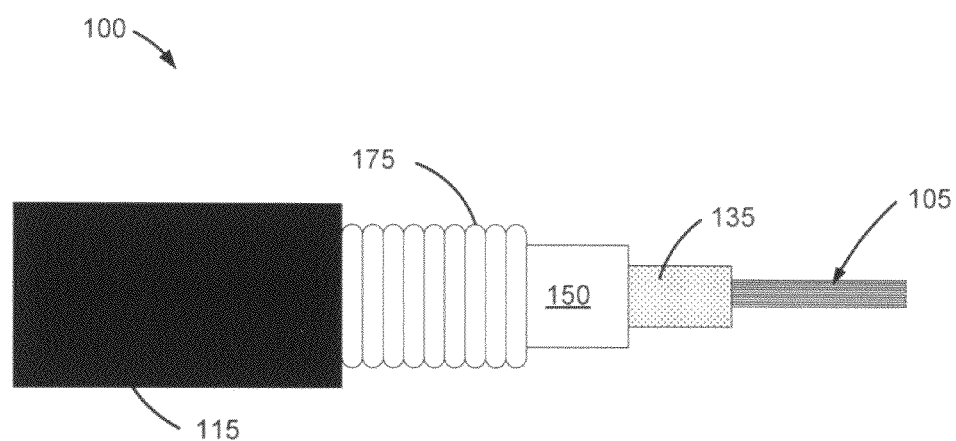
FIG. 2 is a side view of an exemplary fiber optic cable having water blocking barriers, in accordance with certain exemplary embodiments.
Figure 3:
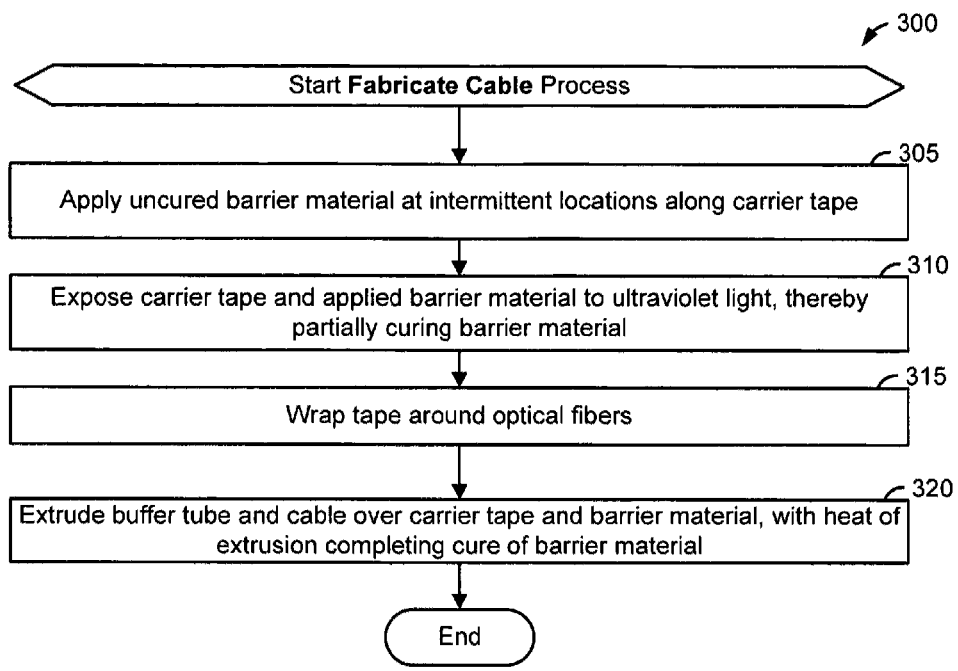
FIG. 3 is a flowchart depicting an exemplary process for fabricating a fiber optic cable having water blocking barriers, in accordance with certain exemplary embodiments.
Figure 4:
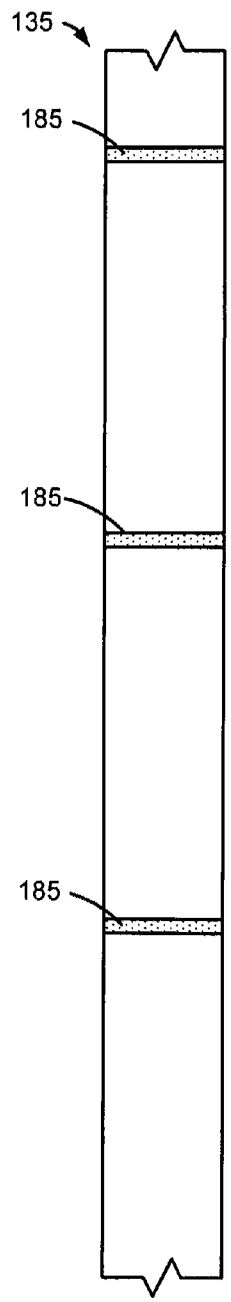
FIG. 4 is an overhead view of a carrier tape having barrier material applied thereon, in accordance with certain exemplary embodiments.
Figure 5:
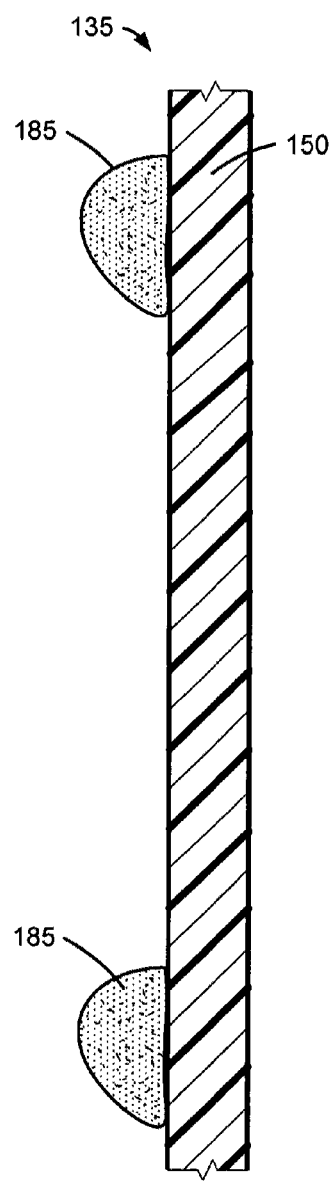
FIG. 5 is a side cross sectional view of a carrier tape having barrier material applied thereon, in accordance with certain exemplary embodiments.
Figure 6:
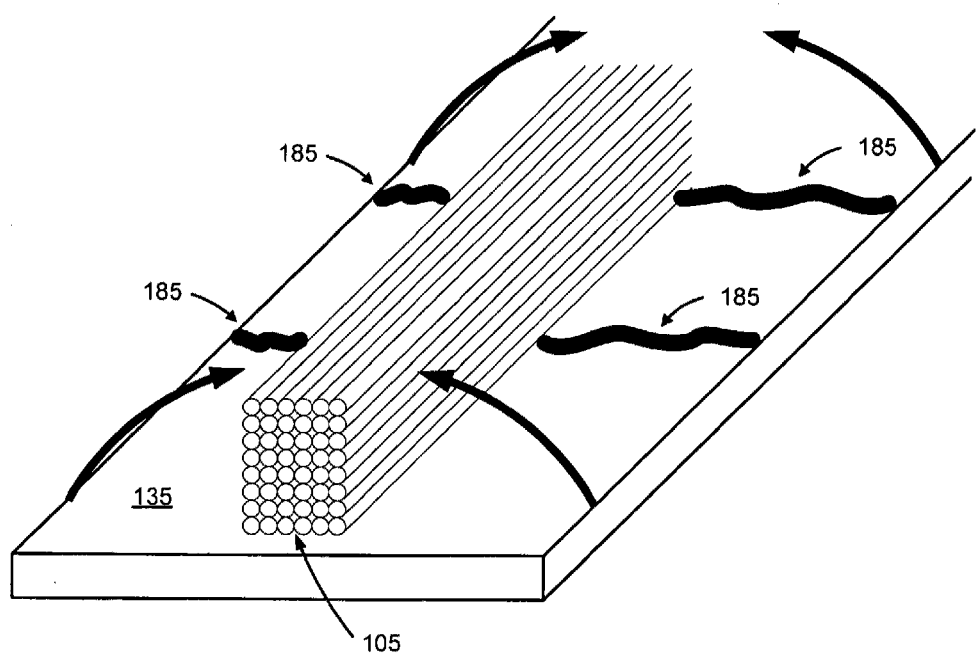
FIG. 6 is an illustration of an exemplary technique for wrapping a carrier tape around optical fiber ribbons, in accordance with certain exemplary embodiments.
Figure 7:
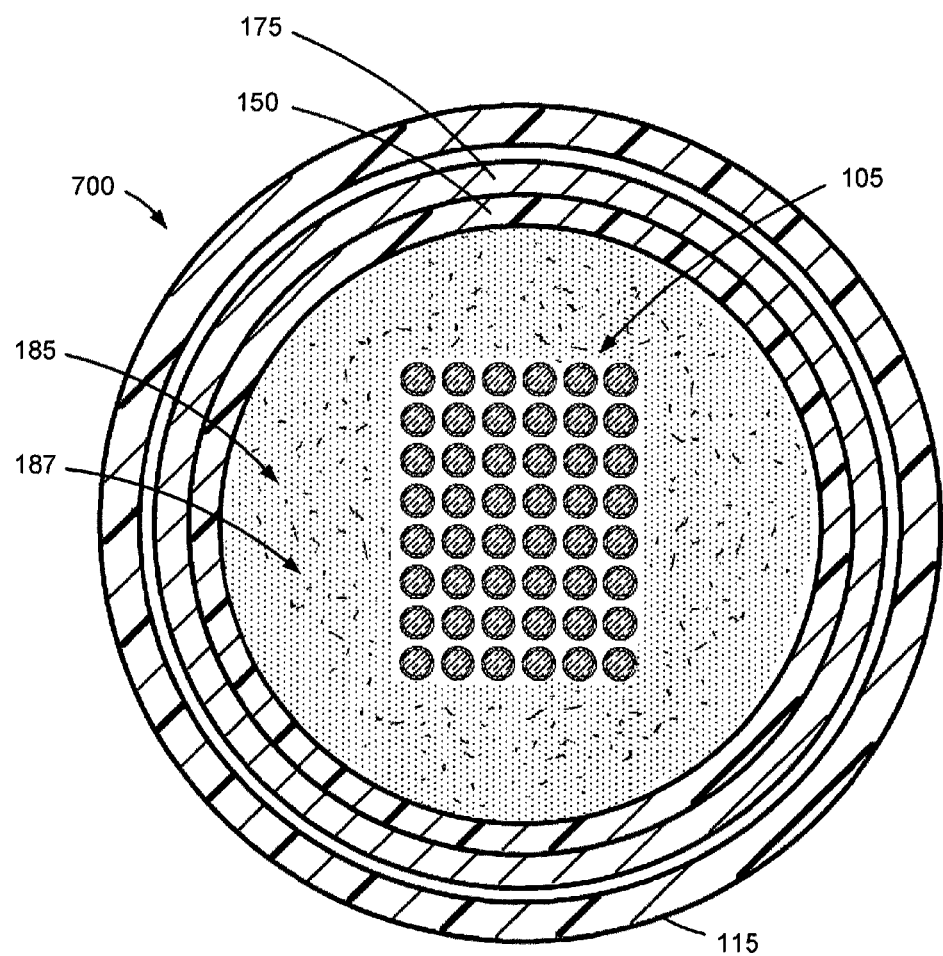
FIG. 7 is a cross sectional view of an exemplary fiber optic cable having water blocking barriers, in accordance with certain exemplary embodiments.
Figure 8:
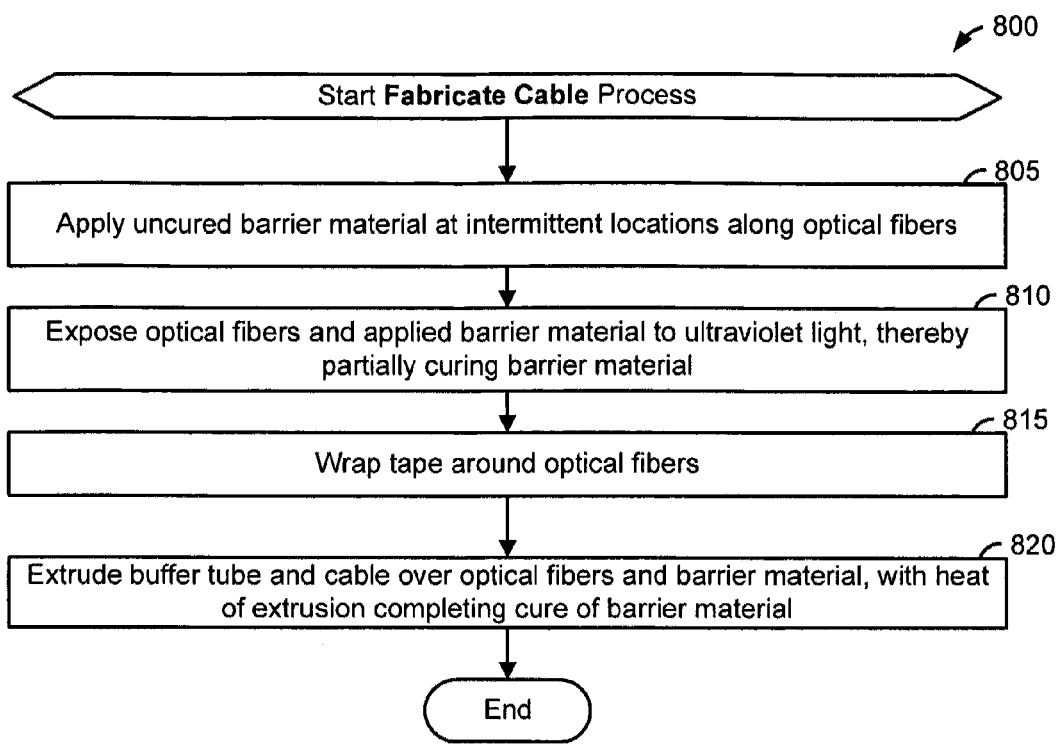
FIG. 8 is a flowchart depicting an exemplary process for fabricating a fiber optic cable having water blocking barriers, in accordance with certain exemplary embodiments.

A method and apparatus for protecting an optical fiber will now be discussed more fully hereinafter with reference to FIGS. 1-8, which describe representative embodiments of the present invention. FIGS. 1 and 7 provide end-on views of exemplary fiber optic cables having water blocking barriers. FIG. 2 provides a side view of an exemplary fiber optic cable having water blocking barriers. FIGS. 3 and 8 offer exemplary processes for fabricating fiber optic cables with water blocking barriers. FIGS. 4 and 5 illustrate exemplary carrier tapes with barrier material applied thereon. FIG. 6 depicts wrapping a carrier tape around an optical fiber bundle.

The invention can be embodied in many different forms and should not be construed as limited to the embodiments set forth herein; rather, these embodiments are provided so that this disclosure will be thorough and complete, and will fully convey the scope of the invention to those having ordinary skill in the art. Furthermore, all "examples" or "exemplary embodiments" given herein are intended to be non-limiting, and among others supported by representations of the present invention.

Turning now to the drawings, in which like reference numerals refer to like (but not necessarily identical) elements, exemplary embodiments are described in detail. FIGS. 1 and 2 illustrate a fiber optic cable 100 having water blocking barriers, in accordance with certain exemplary embodiments. FIG. 1 provides an end-on view, while FIG. 2 presents a side view.

As discussed below, the fiber optic cable 100 has a configuration tailored or optimized to inhibit water penetration and water migration down the fiber optic cable 100. Thus, the fiber optic cable 100 can block distilled water, freshwater, condensed water, tap water, rain, ionic waters, salt water, run-off, seawater, brackish water, sewage, etc.

The exemplary fiber optic cable 100 includes a jacket 115 providing the cable's outer, cylindrical surface. The jacket 115 can be characterized, in various embodiments, as an outer sheath, an outer jacket, a casing, or a shell. The jacket 115 can have a polymer composition, for example a fluoropolymer such as FEP, TFE, PTFE, PFA, etc. Alternatively, the jacket 115 can comprise olefin, polyester, silicone, polypropylene, polyethylene, medium density polyethylene, high density polyethylene, polymide, or some other polymer or other material that provides acceptable strength, fire resistance, or abrasion and chemical properties as may be useful for various applications. Generally, the jacket 115 provides environmental protection as well as strength and structural support.

In the illustrated embodiment, the jacket 115 circumferentially covers a corrugated metal armor 175 that offers mechanical protection, including crush resistance. In many situations the corrugated metal armor 175 is optional and may or may not extend along the length of the fiber optic cable 100. In certain exemplary embodiments, the corrugated metal armor 175 comprises a shield, and the fiber optic cable 100 can be viewed as a shielded cable, for example.

In certain exemplary embodiments, the fiber optic cable 100 may comprise a small annular space between the jacket 115 and the corrugated metal armor 175. Alternatively, the jacket 115 can adhere to the corrugated metal armor 175, for example as a result of a fabrication process that extrudes the jacket 115 over the corrugated metal armor 175. In certain exemplary embodiments, the corrugated metal armor 175 includes an outer coating of polymer that adheres to the jacket 115 when the jacket 115 is applied to the fiber optic cable 100. In this situation, the coating of the polymer bonds the jacket 115 and the corrugated metal armor 175 to one another.

In certain exemplary embodiments, the fiber optic cable 100 includes strength members (not illustrated in FIGS. 1 and 2), such as slender fiberglass rods or aramid cords, disposed between the corrugated metal armor 175 and the jacket 115. For example, two radial strength members can be located under the jacket 115 to enhance structural support.

One or more "rip cords" also may be disposed between the jacket 115 and the corrugated metal armor 175 to facilitate separating the jacket 115 from the corrugated metal armor 175 via pulling the rip cords. In other words, the rip cords help open the fiber optic cable 100 for installation or field service.

The fiber optic cable 100 also includes a buffer tube 150 disposed beneath the corrugated metal armor 175. In certain exemplary embodiments, an annular gap is present between the buffer tube 150 and the corrugated metal armor 175. Alternatively, the buffer tube 150 and the corrugated metal armor 175 can be essentially flush with one another.

The term "buffer tube," as used herein, generally refers to a tube for containing one or more optical fibers and for providing such optical fibers annular space for lateral movement. When a fiber optic cable is bent, optical fibers in a buffer tube of the cable may move towards one side of the buffer tube, for example.

In certain exemplary embodiments, the fiber optic cable 100 includes an aramid material or some other form of strength member disposed between the buffer tube 150 and the corrugated metal armor 175. One or more rip cords, such as a high strength ripcord, also may be disposed between the buffer tube 150 and the corrugated metal armor 175 to facilitate opening the corrugated metal armor 175 in connection with terminating the fiber optic cable 100, or performing some related service.

In certain exemplary embodiments, the buffer tube 150 extends along the fiber optic cable's longitudinal axis and is formed from high density polyethylene. The buffer tube 150 provides a space 110 for optical fibers 105 and protective materials. The space 100 is a three-dimensional or cylindrical volume extending along the fiber optic cable 100.

In the illustrated embodiment, the fiber optic cable 100 contains 48 optical fibers 105 in the buffer tube 150. The optical fibers 105 can form a bundle of loose optical fibers 105 or a bundle with ribbons of the optical fibers 105 adhering to one another to form a single unit. A twist in the bundle of optical fibers 105 along the length of the fiber optic cable 100 captures a ribbon stack into a single unit and helps distribute bending stresses among individual optical fibers 105. That is, a stack of ribbons of optical fibers 105 exhibits a lay or a periodic rotation about its central axis. In certain exemplary embodiments, the bundle of optical fibers 105 has freedom of motion within the buffer tube 150, as the inner diameter of the buffer tube 150 can be larger than the diagonal of the bundle's cross section.

In other words, in certain exemplary embodiments, the optical fibers 105 are organized in linear arrays or "ribbons" of optical fibers 105, with arrays stacked on top of one another. For example, each ribbon may include 12, 24, or more optical fibers 105, with the ribbon stacked to achieve the desired fiber capacity. In certain alternative embodiments, the optical fibers 105 may be arranged as a bundle of loose fibers, rather than a stack of ribbons.

The illustrated number of optical fibers 105 and the illustrated configuration are intended to be exemplary rather than limiting. Each optical fiber 105 could be a single mode fiber or some other optical waveguide that carries data optically 10 or 40 Giga bits per second ("Gbps") or some other appropriate data rate, for example. In various exemplary embodiments, the optical fibers 105 can be single mode, or multimode and can have a composition based on glass, glassy, or silica material. Alternatively, the optical fibers 105 can incorporate plastic material as an optical transmission medium.

The fiber optic cable 100 also includes water blocking barriers 187 comprising water blocking material 185 disposed intermittently within the buffer tube 150 and around the optical fibers 105. The view of FIG. 1 provides a cross section of the fiber optic cable 100 as seen if the cable 100 was severed at the location of one of the water blocking barriers 187.

In the illustrated embodiment, each water blocking barrier 187 circumferentially encapsulates or surrounds the optical fibers 105 and extends laterally from the optical fibers 105 to a carrier tape 135 to form a mechanical seal around the optical fibers 105. The water blocking barriers 187 can adhere to the optical fibers 105 and to an interior surface of the carrier tape 135 facing the optical fibers 105. The water blocking barriers 187 provide a mechanical seal that impedes the flow of water within the buffer tube 150.

The exterior surface of the carrier tape 135 can adhere to or be coupled to an inner wall or surface of the buffer tube 150. For example, the exterior surface of the 135 may not be strongly coupled to the buffer tube 150 in such a way to allow relative movement between the carrier tape 135, the optical fibers 105, and the water blocking barriers 187, collectively the fiber-barrier-tape system and the buffer tube 150 and cable 100—as the cable 100 undergoes tensile, contractive, and bend loadings. This provides a higher degree of freedom for the optical fibers 105 under cable tensile, thermal, and bending loads. In certain exemplary embodiments, the fiber optic cable 100 can include a small annular space between the exterior surface of the carrier tape 135 and the inner surface of the buffer tube 150. Such an embodiment may allow for additional relative movement between the fiber-barrier-tape system and the buffer tube 150.

The water blocking barriers 187 can be disposed at intermittent locations within the buffer tube 150 along the length of the fiber optic cable 100. Thus, the water blocking barriers 187 may be separated from adjacent water blocking barriers 187 by a space. Each pair of water blocking barriers 187 may be separated by substantially the same or a similar distance. Alternatively, the water blocking barriers 187 may be separated by unequal distances or with varying frequencies along the length of the fiber optic cable 100. In certain exemplary embodiments, the water blocking barriers 187 can be disposed within the buffer tube 150 with a spacing of approximately 25 mm to approximately 3000 mm between adjacent water blocking barriers 187. In certain exemplary embodiments, the water blocking barriers 187 may be separated by at least a distance equal to an outer circumference of the fiber optic cable 100.

The separation between pairs of water blocking barriers 187 can be configured based on the application for the fiber optic cable 100. For example, if the fiber optic cable 100 is intended to be deployed in an application that calls for less than two meters of water migration inside the buffer tube 150, the water blocking barriers 187 may be separated by a distance less than two meters, for example one or one and a half meters. However, it may be desirable to space the water blocking barriers 187 at smaller distances to allow for any defective, under-formed, damaged, or otherwise inoperable water blocking barriers 187.

A gas, such as air, can be disposed inside the buffer tube 150 between adjacent water blocking barriers 187. That is, a volume of space defined by surfaces of adjacent water blocking barriers 187, the inner surface of the buffer tube 150 and the surface of the carrier tape 135 facing the buffer tube 150 can include a hollow region. Rather than being filled with a fluid or gel for protecting the optical fibers, these hollow regions between adjacent water blocking barriers 187 can be dry.

The carrier tape 135 can comprise a water blocking or water-swellable material. For example, the carrier tape 135 may comprise a double side non-conductive water-blocking tape. The carrier tape 135 may be fabricated from a polyester fabric, such as a non-woven polyester fabric, and include a polyacrylate water-swelling powder dispersed therein. The carrier tape 135 also may include a corrosion inhibitor.

In certain exemplary embodiments, the carrier tape 135 may be impregnated with water blocking Super Absorbent Polymers ("SAP's"). In such embodiments, the carrier tape may be positioned inside the buffer tube 150 such that the SAP's are directed away from the optical fibers 105 and/or towards the buffer tube 150. In certain exemplary embodiments, the SAP's may contact the buffer tube 150.

The water blocking barriers 187 can be formed from curable barrier material 185, such as curable acrylate or other polymer. The barrier material 185 also can comprise one or more initiators, such as a photoinitiator and/or a thermal initiator. The term "photoinitiator," as used herein, generally refers to an ingredient, a substance, or a compound that, in response to absorption of light or illumination, undergoes a reaction, producing one or more reactive species that are capable of initiating, causing, or inducing polymerization of a polymerizable material. For example, free-radical photoinitiators produce free radicals in response to absorbing light, while cationic photoinitiators produce cations in response to illumination or light exposure.

The term "thermal initiator," as used herein, generally refers to an ingredient, a substance, or a compound that, in response to being exposed to a certain level of heat, undergoes a reaction, producing one or more reactive species that are capable of initiating, causing, or inducing polymerization of a polymerizable material. For example, free-radical thermal initiators produce free radicals in response to heat exposure, while cationic thermal initiators produce cations in response to heat exposure. Thus, photoinitiators and thermal initiators can be viewed as reactants that induce a reaction in response to a stimulus.

In certain exemplary embodiments, the water blocking barriers 187 may be formed using a two stage curing process comprising partial UV curing of the barrier material 185 followed by thermal curing. In such an embodiment, the barrier material 185 used to form the water blocking barriers 187 may comprise a free-radical UV photoinitiator and a cationic thermal initiator. The barrier material 185 may be applied to the carrier tape 135 at intermittent locations along the length of the carrier tape 135. The carrier tape 135 and the barrier material 185 can then be exposed to a UV light to partially cure the barrier material 185. The carrier tape 135 can then be wrapped around the optical fibers 105 prior to the thermal curing process. This thermal curing process may be accomplished prior to or during an extrusion process where a buffer tube 150 and/or a jacket 115 is extruded over the optical fibers 105 and the carrier tape 135. In certain exemplary embodiments, the thermal curing process comprises or induces crosslinking.

This two step curing process adheres the barrier material 185 to the optical fibers 105 and to the surface of the carrier tape 135 to form the water blocking barriers 187. The water blocking barriers 187 can include derivatives of the photoinitiators resulting from the curing process. For example, the water blocking barriers 187 may include a derivative of a substance, such as a UV photoinitiator, that induces polymerization in response to an application of UV light. In addition, the water blocking barriers 187 may include a derivative of a substance, such as a thermal initiator, that induces polymerization in response to an application of or exposure to heat.

In certain exemplary embodiments, the barrier material 185 also includes water-swellable material or particles. The water-swellable particles can be dispersed substantially throughout the barrier material 185 prior to curing. The water-swellable particles also can be dispersed substantially throughout each water blocking barrier 187 after the curing process is completed.

FIG. 3 is a flowchart depicting an exemplary process 300 for fabricating a fiber optic cable 100 having water blocking barriers 187, in accordance with certain exemplary embodiments. As illustrated in FIG. 3, the process 300 begins at step 305 with applying an uncured barrier material 185 at intermittent locations along a surface of a carrier tape 135. The barrier material 185 can include one or more initiators, such as a UV photoinitiator and a thermal initiator.

The uncured barrier material 185 can be applied to the surface of the carrier tape 135 such that the barrier material 185 extends substantially across the entire width of the carrier tape 135. For example, FIG. 4 depicts a portion of an exemplary carrier tape 135 having barrier material 185 applied thereon, in accordance with certain exemplary embodiments. Referring to FIG. 4, the illustrated portion of exemplary carrier tape 135 comprises three strips of barrier material 185 along the surface of the carrier tape 135. In this illustrated embodiment, each strip of barrier material 185 extends across the entire width of a surface of the carrier tape 135.

The uncured barrier material 185 can be applied to the surface of the carrier tape 135 using a die or other appropriate technology. The die can form a three dimensional droplet, bead, or other shape of barrier material 185 in intermittent locations along the length of the carrier tape 135. For example, FIG. 5 depicts an exemplary carrier tape 135 having strips of barrier material 185 applied thereon, in accordance with certain exemplary embodiments. As shown in FIG. 5, the barrier material 185 can comprise an imperfect hemispherical shape extending from the carrier tape 135. In certain exemplary embodiments, the barrier material 185 comprises an oblong shape perpendicular to the direction of the carrier tape 135.

The amount of barrier material 185, and thus the size of the droplet or bead of barrier material 185, that is applied to a carrier tape 135 can vary based on the number of optical fibers 105 being installed in the buffer tube 150 and on the size of the buffer tube 150. For example, a greater amount of barrier material 185 per water blocking barrier 187 may be used in an 864 fiber cable design compared to that of a 432 fiber count cable design. In addition, more barrier material 185 may be used for forming water blocking barriers 187 in larger buffer tubes 150 as the area to be filled by each water blocking barrier 187 may be larger.

In step 310, the carrier tape 135 and the applied barrier material 185 are exposed to a controlled dose of UV light. The UV light causes the free-radical UV photoinitiator in the barrier material 185 to initiate a polymerization of the barrier material 185. This polymerization can provide a partial curing of the barrier material 185.

In step 315, the carrier tape 135 is wrapped around the optical fibers 105. FIG. 6 is an illustration of an exemplary technique for wrapping a carrier tape 135 around an optical fiber bundle 105, in accordance with certain exemplary embodiments. FIG. 6 illustrates wrapping 48 optical fibers 105 as an aid to visualizing an exemplary assembling technique.

As illustrated in FIG. 6, the optical fibers 105 are disposed adjacent the surface of the carrier tape 135 having the applied barrier material 185 and cover a portion of each strip of barrier material 185. The optical fibers 105 extend essentially parallel with the major longitudinal axis/dimension of the carrier tape 135 and perpendicular with the strips of barrier material 185. Thus, the optical fibers 105 can be viewed as being parallel to the surface or plane of the carrier tape 135. Alternatively, the optical fibers 105 can be viewed as being over or under the carrier tape 135 or being situated along the center axis of the carrier tape 135. Moreover, the optical fibers 105 can be viewed as being essentially parallel to one or both edges of the carrier tape 135.

The long edges of the carrier tape 135 are brought up over the optical fibers 105, thereby encasing the optical fibers 105 or wrapping the carrier tape 135 around or over the optical fibers 105. In certain exemplary embodiments, the motion can be characterized as folding or curling the carrier tape 135 over the optical fibers 105. The long edges can overlap one another following the illustrative motion.

As the strips of barrier material 185 extend across the entire width of the carrier tape 135, the barrier material 185 completely encapsulates or surrounds the optical fibers 105 when the carrier tape 135 is wrapped around the optical fibers 105. The partially cured barrier material 185 adheres to the optical fibers 105 and to the interior surface of the carrier tape 135. Thus, the partially cured barrier material 185 holds the carrier tape 135 in place around the optical fibers 105.

In step 320, the carrier tape 135 having the partially cured barrier material 185 and the optical fibers 105 disposed therein is routed to an extruder. The extruder extrudes a buffer tube 150 over the carrier tape 135 and a second extruder then extrudes a jacket 115 over the buffer tube 150. The heat generated by the extrusion process further cures the barrier material 185 into final form as water blocking barriers 187. In certain exemplary embodiments, the barrier material 185 can comprise a cationic thermal initiator that reacts when exposed to certain levels of heat. The extruder(s) can provide this level of heat to initiate the reaction. As part of this final curing process, each strip, bead, or droplet of barrier material 185 adheres and/or bonds to the interior surface of the carrier tape 135 and to the optical fibers 105 to provide a mechanical seal that impedes the flow of water within the carrier tape 135.

Another exemplary process for fabricating a fiber optic cable 100 can include providing a carrier tape 135 that includes two edges that extend lengthwise, a first side between the two edges and a second side opposite the first side. Multiple bands of a viscous barrier material 185 can be applied to the first side of the carrier tape 135, where each of the bands extend essentially between the two edges. Each band can be separated from an adjacent band by a distance, such as at least a distance equal to an outer diameter of the fiber optic cable. A fiber optic core can be formed by wrapping the carrier tape 135 over a stack of optical fiber ribbons 105, with the first side facing the stack 105. The bands of barrier material 185 can be partially cured with UV light. The fiber optic cable 100 can be finished in response to extruding a buffer tube 150 over the fiber optic core and a jacket 115 over the buffer tube 150, where heat of the extrusion further cures the bands of barrier material 185. In certain exemplary embodiments, each of the bands of further cured barrier material 185 circumscribes the fiber optic core and provides a water blocking seal between the first side of the tape and the stack of optical fiber ribbons. In certain exemplary embodiments, the finished cable comprises and annulus of gaseous material between the second side of the carrier tape 135 and an inner wall of the buffer tube 150. In certain exemplary embodiments, the heat of the extrusion completes curing of the bands of barrier material 185 and the fiber optic core has freedom of longitudinal motion with respect to the buffer tube in the finished fiber optic cable 100.

Another exemplary process for fabricating a fiber optic cable 100 can include applying a barrier material 185 to a carrier tape 135. The barrier material 185 can be partially cured in response to exposing the barrier material 185 to light. The carrier tape 135 with the barrier material 185 applied thereto can be curled around the optical fiber 105. A circumferential covering, such as a buffer tube 150 or jacket 115, can be applied to the carrier tape 135, the barrier material 185, and the optical fiber 105. The barrier material 185 can be further cured in response to heating the applied barrier material 185. In certain exemplary embodiments, the heating the applied barrier material 185 comprises extruding the circumferential covering over the carrier tape 135. In certain exemplary embodiments, the circumferential covering can be applied to the carrier tape 135 in parallel with further curing the applied barrier material 185 in response to heating the applied barrier material 185. In certain exemplary embodiments, the step of applying the circumferential covering can include extruding a buffer tube 150 over the carrier tape 135, the applied barrier material 185, and the optical fiber 105; and applying a jacket 115 over the buffer tube 150. In certain exemplary embodiments, the further cured barrier material 185 is bonded to the carrier tape 135 and to the optical fiber 105. In certain exemplary embodiments, further curing the applied barrier material 185 includes fully curing the applied barrier material 185, where the fully cured applied barrier material 185 forms a water seal between the carrier tape 135 and the optical fiber 105, with the water barrier circumscribing the optical fiber 105. In certain exemplary embodiments, applying the barrier material 185 to the carrier tape 135 includes applying the barrier material 185 to the carrier tape 135 at intermittent longitudinal locations along the carrier tape 135, where the further cured barrier material 185 circumscribes the optical fiber 105. In certain exemplary embodiments, the carrier tape 135 includes two substantially parallel edges extending along the fiber optic cable 100, where the barrier material 185 is flowable during the step of applying the barrier material 185 to the carrier tape 135, and where the step of applying the barrier material 185 to the carrier tape 135 includes: applying to the carrier tape 135 a first stripe of the barrier material 185 that extends substantially between the two substantially parallel edges; and applying to the carrier tape 135 a second stripe of the barrier material 185 that extends substantially between the two parallel edges, where a predetermined longitudinal distance separates the first stripe and the second stripe.

Another exemplary process for fabricating a fiber optic cable 100 can include applying a barrier material 185 that is flowable to one side of a carrier tape 135 of dielectric material at selected locations along the carrier tape 135. A fiber optic core can be formed in response to wrapping the carrier tape 135 around a group of optical fibers 105 and partially curing the barrier material 185 with UV light, where the partially cured barrier material 185 adheres to the carrier tape 135 and to the group of optical fibers 105. The fiber optic core can be, passed through an extruder head where a buffer tube 150 is extruded over the fiber optic core and a jacket 115 is extruded over the buffer tube 150. The extrusion heat can complete the curing of the partially cured barrier material 185. In certain exemplary embodiments, the step of applying the barrier material 185 includes applying multiple strips of the barrier material 185 to the carrier tape 135 at each of the selected locations, and where each strip extends across the carrier tape 135. In certain exemplary embodiments, the partially cured barrier material 185 circumscribes the group of optical fibers 105. In certain exemplary embodiments, the carrier tape 135 includes two edges extending substantially adjacent the one side, and where the partially cured barrier material 185 extends substantially between the two edges. In certain exemplary embodiments, the carrier tape 135 includes a first edge and a second edge, each running along the one side, where the partially cured barrier material 185 spans from the first edge to the second edge. In certain exemplary embodiments, the fiber optic core has at least some freedom of longitudinal motion within the buffer tube 150 following the compete curing of the partially cured barrier material 185. In certain exemplary embodiments, the passing step includes completing fabrication of the fiber optic cable and the fiber optic core is shifted longitudinally within the buffer tube 150 in response to applying at least some force to the completed fiber optic cable 100. In certain exemplary embodiments, the extruded buffer tube 150 is seamless. In certain exemplary embodiments, the completely cured barrier material 185 is bonded to the one side of the carrier tape 135 and the group of optical fibers and an annulus between an opposite side of the carrier tape 135 and the buffer tube 150 is substantially free of the completely cured barrier material 185.

FIG. 7 is a cross sectional view of an exemplary fiber optic cable 700 having water blocking barriers 187, in accordance with certain exemplary embodiments. The fiber optic cable 700 illustrated in FIG. 7 is an alternative embodiment to that of the fiber optic cable 100 illustrated in FIGS. 1 and 2. Referring to FIG. 7, the fiber optic cable 700 comprises a jacket 115, a corrugated metal armor 175, a buffer tube 150, and water blocking barriers 187 comprising water blocking material 185 disposed intermittingly within the buffer tube 150. These aforementioned elements of the fiber optic cable 700 can be substantially similar to the corresponding elements of the fiber optic cable 100 discussed above. Although not shown, the fiber optic cable 700 also can include strength members, rip cords, and other optional components as discussed above.

The exemplary fiber optic cable 700 differs from the fiber optic cable 100 in that the fiber optic cable 700 does not include a carrier tape 135. Instead, as illustrated in FIG. 7, the water blocking barriers 187 disposed in the fiber optic cable 700 adhere to an inner surface of the buffer tube 150 and to the optical fibers 105.

Similar to the exemplary fiber optic cable 100, the water blocking barriers 187 can be disposed at intermittent locations within the buffer tube 150 along the length of the fiber optic cable 700. The water blocking barriers 187 of the fiber optic cable 700 also can be formed from a barrier material 185 comprising one or more initiators, such as a UV photoinitiator and a thermal initiator. However, instead of applying the barrier material 185 to a carrier tape, the barrier material 185 is applied directly to the optical fibers 105.

The barrier material 185 can be applied intermittently in strips, droplets, or beads, to each side of an optical fiber bundle 105 so that when the buffer tube 150 is extruded over the optical fiber bundle 105, each strip, droplet, or bead of barrier material 185 forms a water blocking barrier 187 between the optical fiber bundle 105 and the interior surface of the buffer tube 150. These water blocking barriers 187 can each provide a seal that impedes the flow of water, including ionic and other soiled waters from advancing within the buffer tube 150.

FIG. 8 is a flowchart depicting an exemplary process 800 for fabricating a fiber optic cable 700 having water blocking barriers 187, in accordance with certain exemplary embodiments. As illustrated in FIG. 8, the process 800 begins at step 805 with applying an uncured barrier material 185 at intermittent locations along an optical fiber bundle 105. The barrier material 185 can include one or more initiators, such as a UV photoinitiator and a thermal initiator.

The uncured barrier material 185 can be applied to the optical fiber bundle 105 such that the barrier material 185 completely surrounds the optical fiber bundle 105. The uncured barrier material 185 can be applied to the optical fiber bundle 105 using a die or other appropriate technology. The die can form a three dimensional droplet, bead, or other shape of barrier material 185 in intermittent locations along the length of the optical fiber ribbons 105.

The amount of barrier material 185, and thus the size of the droplet or bead of barrier material 185, that is applied to the optical fiber bundle 105 can vary based on the number of optical fibers in the optical fiber bundle 105 being installed in the buffer tube 150 and on the size of the buffer tube 150. For example, a greater amount of barrier material 185 per water blocking barrier 185 may be used in an 864 fiber cable design compared to that of a 432 fiber count cable design. In addition, more barrier material 185 may be used for forming water blocking barriers 187 in larger buffer tubes 150 as the area to be filled by each water blocking barrier 185 may be larger.

In step 810, the optical fiber bundle 105 and the applied barrier material 185 are exposed to a controlled dose of UV light. The UV light causes the free-radical UV photoinitiator in the barrier material 185 to initiate a polymerization of the barrier material 185. This polymerization can provide a partial curing of the barrier material 185 to the optical fiber bundle 105.

In step 815, an optional carrier tape (not shown in FIG. 7) may be applied to the optical fiber bundle 105. For, example a carrier tape may be wrapped around or over the optical fiber ribbons 105. The partially cured barrier material 185 can provide an adhesive to hold the carrier tape around the optical fiber bundle 105. Step 815 can be substantially similar to that of step 315 of FIG. 3.

In step 820, the optical fiber bundle 105 having the barrier material 185 partially cured therein is routed to an extruder. The extruder extrudes a buffer tube 150 over the optical fiber bundle 105 and a second extruder then extrudes a jacket 115 over the buffer tube 150. The heat generated by the extrusion process further cures the barrier material 185 into final form as water blocking barriers 187. In certain exemplary embodiments, the barrier material 185 can comprise a cationic thermal initiator that reacts when exposed to certain levels of heat.

The extruder(s) can provide this level of heat to initiate the reaction. As part of this final curing process, each strip, bead or droplet of barrier material 185 adheres and/or bonds to the interior surface of the buffer tube 150 and to the optical bundle 105 to provide a mechanical seal that impedes the flow of water within the carrier tape 135.

Although the embodiments presented above have been discussed largely in terms of fiber optic cables having a single buffer tube with intermittent water blocking barrier disposed therein, the invention also can be used with other fiber optic cable core configurations. For example, a fiber optic core comprising multiple buffer tubs each containing one or more optical fibers can employ water blocking barriers in each buffer tube.

In another example, a fiber optic cable can include multiple buffer tubes, for example in a six-around-one configuration whereby six buffer tubes are disposed around a central buffer tube in a core of the fiber optic cable. Each of the buffer tubes may comprise intermittent water blocking barriers formed from a two stage curing process described above, while the core comprises other water blocking technologies, for example one or more water blocking tapes, yarns, or foams.

Technology for protecting a cabled optical fiber from water has been described. From the description, it will be appreciated that an embodiment of the present invention overcomes the limitations of the prior art. Those skilled in the art will appreciate that the present invention is not limited to any specifically discussed application or implementation and that the embodiments described herein are illustrative and not restrictive. From the description of the exemplary embodiments, equivalents of the elements shown therein will suggest themselves to those skilled in the art, and ways of construction other embodiments of the present invention will appear to practitioners of the art.

The exemplary processes and acts described in the embodiments presented previously are illustrative, and, in alternative embodiments, certain acts can be performed in a different order, in parallel with one another, omitted entirely, and/or combined between different exemplary embodiments, and/or certain additional acts can be performed, without departing from the scope and spirit of the invention. Accordingly, such alternative embodiments are included in the inventions described herein.

Although specific embodiments have been described above in detail, the description is merely for purposes of illustration. It should be appreciated, therefore, that many aspects described above are not intended as required or essential elements unless explicitly stated otherwise. Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the invention defined in the following claims, the scope of which is to be accorded the broadest interpretation so as to encompass such modifications and equivalent structures.

What is claimed is:

1. A fiber optic cable comprising:
   an outer jacket extending lengthwise;
   a tube extending lengthwise, circumferentially surrounded by the outer jacket, and comprising an inner wall;
   an optical fiber disposed inside the tube and extending lengthwise; and
   a plurality of regions of barrier material spaced intermittently along the fiber optic cable, wherein each region circumferentially encapsulates the optical fiber and adheres to the inner wall to form a seal;

wherein each region of barrier material comprises:
a polymer;
a derivative of a first substance that induces polymerization in response to ultraviolet light; and
a derivative of a second substance that induces polymerization in response to heat.

2. The fiber optic cable of claim 1, wherein each region of barrier material further comprises water-swellable particles dispersed substantially throughout the region.

3. The fiber optic cable of claim 1, wherein each seal is operative to impede water flow within the tube.

4. The fiber optic cable of claim 1, wherein an annulus of gaseous material is disposed between the inner wall and the optical fiber.

5. The fiber optic cable of claim 1, wherein the second substance is operable to trigger polymerization in response to heat from an extruder.

6. The fiber optic cable of claim 1, wherein the polymerization substantially bonds each barrier region to the inner wall and to the optical fiber.

7. The fiber optic cable of claim 1, wherein the first substance is operable to initiate a partial cure of each region of barrier material in response to illumination by the ultraviolet light,
wherein the derivative of the first substance comprises one or more compounds produced by a light-initiated reaction of the first substance,
wherein the second substance is operable to induce substantially complete cure of each region in response to heat exposure, and
wherein the derivative of the second substance comprises one or more compounds produced by a heated reaction of the second substance.

8. A fiber optic cable comprising:
an outer jacket;
a buffer tube extending lengthwise, circumferentially surrounded by the outer jacket, and comprising an inner surface;
a group of optical fibers disposed within the buffer tube;
a plurality of water blocking barriers spaced intermittently within the buffer tube, each water blocking barrier providing a seal between the inner surface and the group of optical fibers,
wherein each water blocking barrier comprises:
a polymer;
a first product of a photo-induced reaction in which a photoinitiator is a reactant; and
a second product of a heat-induced reaction in which a thermal initiator is a reactant.

9. The fiber optic cable of claim 8, wherein each region of barrier material further comprises water-swellable particles.

10. The fiber optic cable of claim 8, wherein each water blocking barrier circumscribes the group of optical fibers, wherein the photo-induced reaction comprises an ultraviolet-induced reaction.

11. The fiber optic cable of claim 8, wherein an annulus of gaseous material is disposed between the inner wall and the group of optical fibers, and wherein the heat-induced reaction comprises or triggers crosslinking.

12. The fiber optic cable of claim 8, wherein heat of the heat-induced reaction comprises heat of extrusion.

13. The fiber optic cable of claim 8, wherein each water blocking barrier comprises a bond to the group of optical fibers and to the inner surface.

14. The fiber optic cable of claim 8, wherein the first product is operable to trigger polymerization for the polymer.

15. A fiber optic cable comprising:
a tube extending lengthwise, within a core of the fiber optic cable; and
a plurality of seals, each disposed at a different longitudinal location along the fiber optic cable and substantially filling an annulus between the tube and an optical fiber disposed in the tube,
wherein each seal comprises:
a cured material;
a photoinitiator or a product of a reaction of the photoinitiator; and
a thermal initiator or a product of a reaction of the thermal initiator.

16. The fiber optic cable of claim 15, wherein each seal further comprises water-swellable particles.

17. The fiber optic cable of claim 15, wherein the cured material comprises an acrylate.

18. The fiber optic cable of claim 15, wherein the cured material comprises a polymer cured with a combination of heat and light.

19. The fiber optic cable of claim 15, wherein each seal comprises the product of the reaction of the thermal initiator, and wherein the thermal initiator is operable to trigger polymerization in response to an application of heat.

20. The fiber optic cable of claim 15, wherein each seal comprises the product of the reaction of the photoinitiator, and wherein the photoinitiator is operable to trigger polymerization in response to ultraviolet light illumination.

21. The fiber optic cable of claim 15, wherein the reaction of the photoinitiator comprise a first step in two-step curing of the cured material, and wherein the reaction of the thermal initiator comprises a second step in the two-step curing of the cured material.

* * * * *